United States Patent [19]

van den Pol

[11] Patent Number: 4,634,335
[45] Date of Patent: Jan. 6, 1987

[54] ELONGATE, TRANSPORTABLE UNIT STANDING UPRIGHT DURING USE

[75] Inventor: Aart A. van den Pol, AG Nijkerk, Netherlands

[73] Assignee: Multilift B.V., Dronten, Netherlands

[21] Appl. No.: 694,303

[22] Filed: Jan. 24, 1985

[30] Foreign Application Priority Data

Feb. 4, 1984 [NL] Netherlands .................... 8400354

[51] Int. Cl.$^4$ ............................ B60P 1/16; B60P 3/00
[52] U.S. Cl. ...................................... 414/494; 52/119; 414/500; 414/919
[58] Field of Search ............... 414/491, 494, 498–500, 414/332, 787, 919; 52/119

[56] References Cited

U.S. PATENT DOCUMENTS 2,606,676  8/1952  Dempster ........................ 414/469
3,687,319  8/1972  Adam et al. ..................... 414/498 X

FOREIGN PATENT DOCUMENTS 2409952   7/1979  France ............................. 414/332
1008977  11/1965  United Kingdom ............. 414/332

Primary Examiner—Leslie J. Paperner
Assistant Examiner—Stuart J. Millman
Attorney, Agent, or Firm—Oblon, Fisher, Spivak, McClelland, & Maier

[57] ABSTRACT

An elongate, transportable unit (1) standing upright during use and being intended for transport with the aid of a vehicle (7) provided with a loading bridge (8) which can be turned about a pivot axis located near the rear end of the chassis of the vehicle (7) and extending horizontally and transversely of the longitudinal axis of the vehicle. An element (10) is provided with the aid of which a hook-like coupling member can be moved along the loading bridge (8). The transportable uint (1) is provided with an arm (5) which is pivotable about an at least substantially horizontal axis of rotation (6). The arm (5) is provided near its free end (11) with a coupling element for connecting the hook-like coupling member.

3 Claims, 3 Drawing Figures

FIG.I.

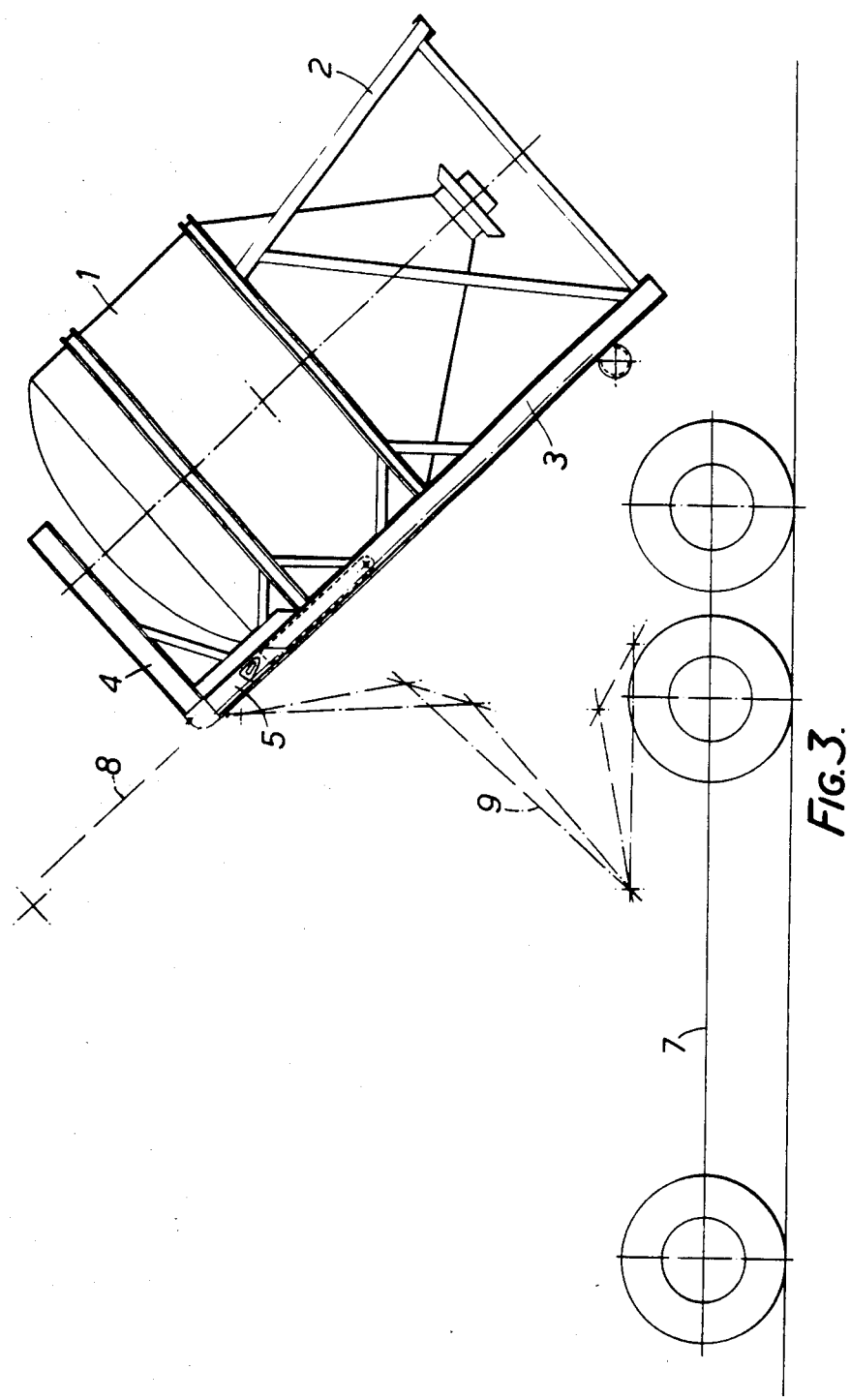

ELONGATE, TRANSPORTABLE UNIT STANDING UPRIGHT DURING USE

FIELD OF THE INVENTION

The invention relates to an elongate, transportable unit standing upright during use and being intended for transport with the aid of a vehicle provided with a loading bridge, which can be turned about a horizontal pivot axis located near the rear end of the chassis of the vehicle and extending transversely of the longitudinal axis of the vehicle, whilst means are provided with the aid of which a hookshaped coupling member can be moved along the loading bridge.

BACKGROUND OF THE INVENTION

Elongate, transportable units standing upright during use (for example, silos or the like) are usually transported in lying position on a vehicle (for example, a van) so that, during loading and/or unloading of the transportable unit, it is necessary to tilt the unit through an angle of 90°.

From Dutch patent specification No. 167,635 there is known a vehicle provided with a loading bridge which can be turned about a pivot axis located near the rear end of the chassis of the vehicle and extending horizontally and transversely of the longitudinal axis of the vehicle. There is provided a hook-like coupling member which can be coupled with the end of a unit to be transported, standing on the ground so that the end of the unit can be drawn up with the aid of the hook, after which the unit can be drawn onto the loading bridge in the direction of the longitudinal axis.

OBJECT OF THE INVENTION

The invention has for its object to design an elongate, transportable unit standing upright during use in a manner such that the object can also be transported with the aid of a vehicle such as is generally used in practice.

SUMMARY OF THE INVENTION

According to the invention, the object of the invention can be achieved in that the transportable unit is provided with an arm pivotable about an at least substantially horizontal axis of rotation. This arm is provided near its free end with coupling means for coupling the hook-like coupling member.

With the construction embodying the invention, when the transportable unit is standing on the ground in its position of use, the free end of the pivotable arm can be turned downwards so that the free end lies within easy reach of a person for coupling the hook-like coupling member with the end of the arm, when the vehicle concerned is standing near the transportable unit. Subsequently the hook-like coupling member can be displaced in the conventional manner along the loading bridge towards the front end thereof, whilst the arm is turned with respect to the transportable unit and the transportable unit is tilted into a position in which the transportable unit lies on the loading bridge. The transportable unit is then displaced along the loading bridge into a position suitable for transport.

BRIEF DESCRIPTION OF THE DRAWINGS

The invention will be described more fully hereinafter with reference to the accompanying drawings schematically showing a transportable unit embodying the invention and the manner in which such a unit can be loaded on or unloaded from a vehicle.

FIGS. 2 and 3 are side elevations like FIG. 1 in subsequent stages of the disposition of the transportable unit on the loading bridge.

DETAILED DESCRIPTION OF THE PRESENTLY PREFERRED EMBODIMENT

Figure 1:
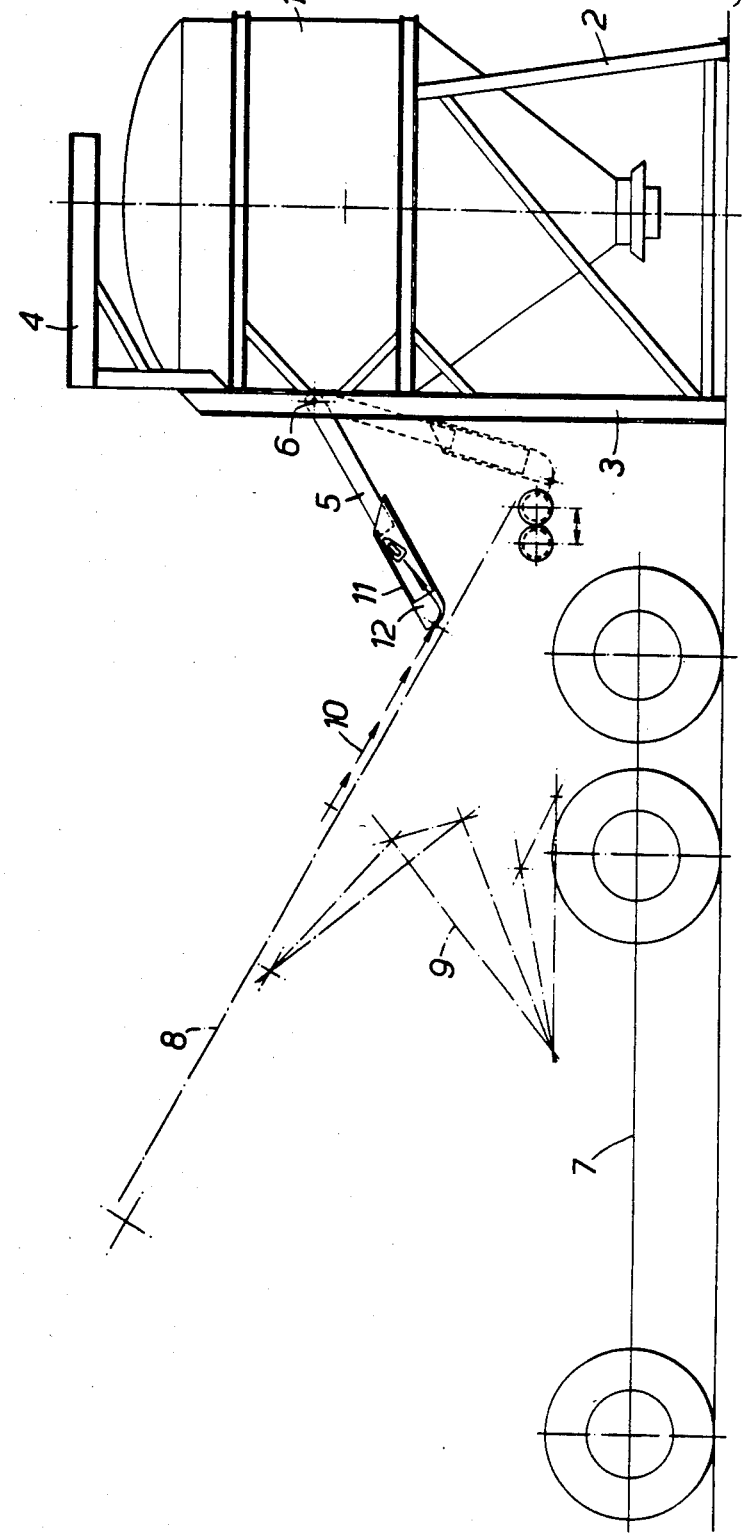
FIG. 1 is a side elevation of a transportable unit embodying the invention. It schematically shows a vehicle arranged near the unit.

In the embodiment shown in the drawings the transportable unit is formed by a silo 1 intended to store, for example, cement. The silo 1 is supported by a frame so that, in the position of use of the silo shown in FIG. 1, the longitudinal axis of the silo is vertical. The frame 2 comprises two frame beams 3 located near one side of the silo. The frame beams 3 are vertical in the position of use shown in FIG. 1. A support 4 is fastened to the top ends of the frame beams 3.

Between the frame beams 3 is coupled the end of an arm 5 with the aid of a pivotal shaft 6.

The transportable unit shown can be transported by means of a vehicle 7 schematically shown in the Figures. The vehicle 7 can be of the kind described in Dutch patent specification No. 167,535. This vehicle is provided with a loading bridge 8 which can be turned with respect to the chassis of the vehicle 7 about a pivotal shaft (not shown) located near the rear side of the chassis. The pivotal shaft extends horizontally at right angles to the direction of length of the vehicle 7. The turning movement of the loading bridge 8 is accomplished with the aid of a setting mechanism 9.

As described in the previously mentioned Dutch Patent Specification, a cable or chain portion 10 is displaceable in the direction of length of the loading bridge 8, whilst a hook-like coupling member is fastened to the end of said chain portion. This hook-like coupling member can be coupled with the aid of coupling means (not shown in detail) in the hollow end 11 of the arm 5, whilst the chain 10 is guided in the manner shown in FIG. 1 along a guide 12 fastened to the free end of the arm 5 and extending transversely of the longitudinal axis of the arm 5.

When the unit formed in this case by the silo 1 and the frame 2 supporting the silo 1 has to be transported, the vehicle 7 is driven backwards towards the silo and the end of the chain 10 is coupled with the pivotable arm 5. At that time the pivotable arm 5 is turned downwards into the position indicated by broken lines in FIG. 1, so that a person standing on the ground can readily hook the end of the chain 10 to the free end of the arm 5 in the manner illustrated in FIG. 1. By subsequently moving the chain 10 with the aid of means (not shown) upwards along the loading bridge 8, the arm 5 is turned around the pivot shaft 6 out of the extreme right-hand position indicated by broken lines in FIG. 1 into the position indicated by solid lines in FIG. 1.

Figure 2:
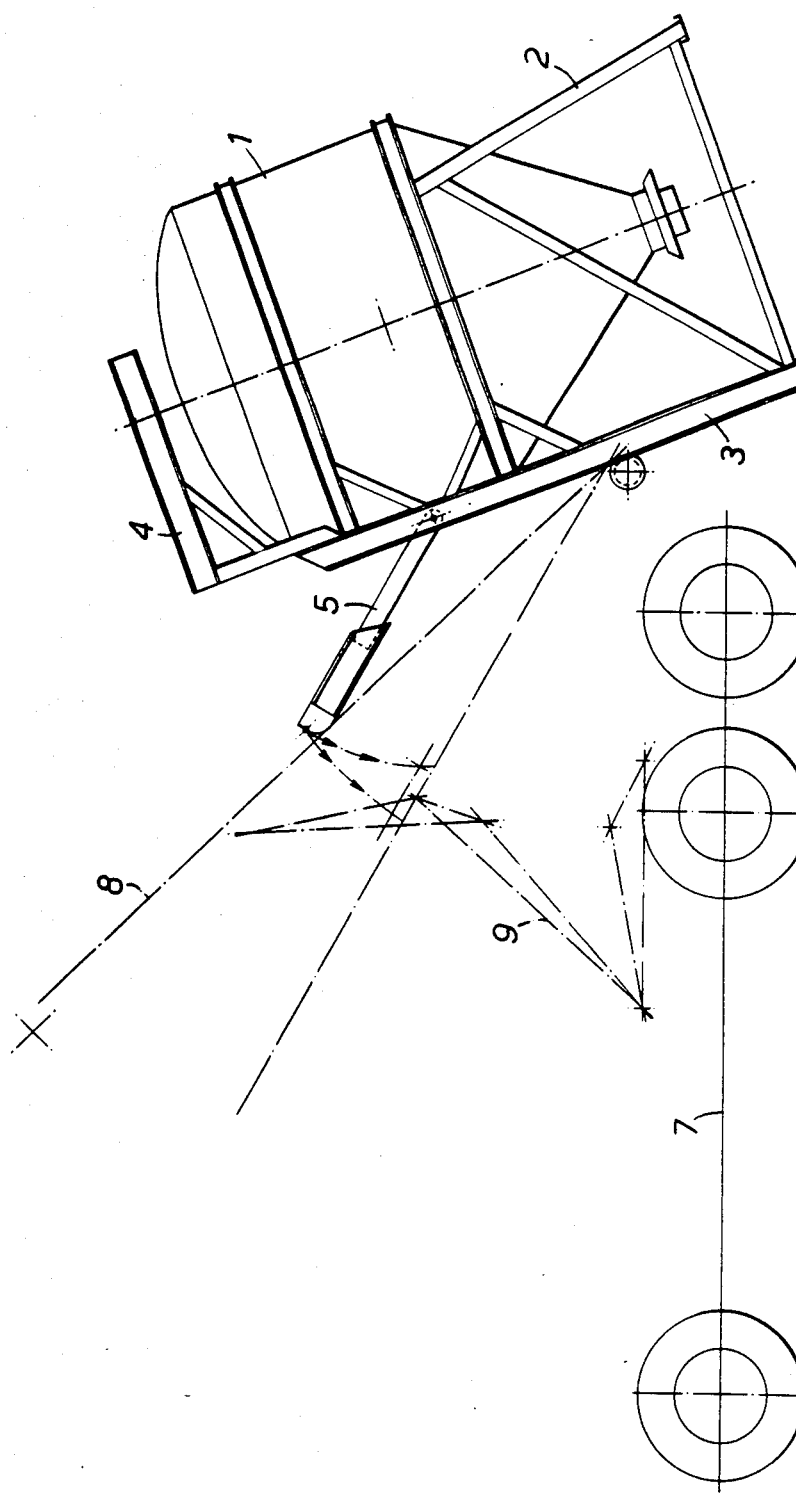

As is shown in FIG. 2, the loading bridge 8 is then set in an even steeper position. When the chain 10 is moved further upwards, the unit 1, 2 to be transported is tilted so that the frame beams 3 bear on the rear end of the loading bridge 8. By a further upward movement of the free end of the arm 5 with the aid of the chain 10, the unit 1, 2 to be transported moves to a position in which it bears completely on the loading bridge 8 as is shown in FIG. 3. Then the end of the arm 5 remote from the pivotal shaft 6 bears on the support 4, and the arm 5 is in line with the frame beams 3. In this position, the unit 1, 2 to be transported is drawn up to the front end of the loading bridge, which is then moved into a horizontal position suitable for road transport.

It will be obvious that for unloading the transportable unit 1, 2, the steps described above can be carried out in the reverse order of succession.

When using the construction embodying the invention, the hook-like coupling member provided at the end of the chain 10 can be readily connected or disconnected with and from the end of the pivotable arm 5 of the unit 1, 2 to be transported by someone standing on the ground. Accordingly, coupling and discoupling of the unit 1, 2 to be transported with the vehicle 7 will not give rise to difficulties. Furthermore, there is no need for taking special precautions on the vehicle 7 to enable the transport of elongate units standing upright in normal use by means of the vehicle, whilst during loading or unloading the unit is tilted through an angle of 90°.

Although the invention is described herein with reference to a transportable unit formed by a silo, it will be obvious that other elongate units can be designed in the manner described for enabling the transport of such units with the aid of the appropriate, conventional vehicle.

The figures used in the claims are only meant to explain more clearly the intention of the invention and are not supposed to be any restriction concerning the interpretation of the invention.

I claim:

1. Apparatus which stands upright during use and which is transported in a horizontal position on a vehicle provided with:
    (a) a loading bridge that is pivotable back and forth between a horizontal transport position and a tilted loading position about a pivot axis that is located near the rear end of the vehicle and that extends horizontally and transversely of the longitudinal axis of the vehicle and
    (b) a flexible, linear force transmission means for loading the apparatus onto the loading bridge and for unloading the apparatus from the loading bridge,
said apparatus comprising:
    (c) an elongate unit having a longitudinal axis;
    (d) a frame mounting said elongate unit, said frame holding said elongate unit in an upright position during use of said elongate unit;
    (e) an arm:
        (i) having a first end and a second end;
        (ii) the first end of said arm being mounted on said frame for pivotal movement about an axis which is at least substantially horizontal when said elongate unit is in its upright position;
        (iii) the second end of said arm being provided with coupling means for coupling said arm to the flexible, linear force transmission means on the vehicle;
        (iv) said arm being pivotal back and forth through at least approximately 180° between a first position which said arm assumes when said elongate unit is in its upright position and a second position which said arm assumes when said elongate unit is in its horizontal position; and
        (v) said arm being sized, shaped, and positioned so that:
            (A) when said elongate unit is in its upright position and said arm is in its first position, the second end of said arm is within reach of someone standing on the ground;
            (B) as said elongate unit is moved from its upright position to its horizontal position, said arm pivots through at least approximately 180° from its first position to its second position; and
            (C) when said elongate unit is in its horizontal position and said arm is in its second position, the second end of said arm is located near the top of said elongate unit; and
    (f) a stop which prevents motion of said arm beyond its second position.

2. Apparatus as recited in claim 1 and further comprising a guide member mounted on the second end of said arm in a position spaced from said coupling means, said guide member serving to guide the flexible, linear force transmission means on the vehicle.

3. Apparatus as recited in claim 1 wherein the axis about which said arm pivots is located at about two-thirds of the overall height of said elongate unit above the ground when said elongate unit is in its upright position.

* * * * *